May 11, 1965 Z. I. SLAWSKY ETAL 3,183,478
CORRELATION SONOBUOY SYSTEM AND METHOD
Filed Feb. 25, 1963 3 Sheets-Sheet 1

INVENTORS.
ZAKA I. SLAWSKY
SAMUEL J. RAFF
BY
ATTY.

May 11, 1965   Z. I. SLAWSKY ETAL   3,183,478
CORRELATION SONOBUOY SYSTEM AND METHOD
Filed Feb. 25, 1963   3 Sheets-Sheet 2
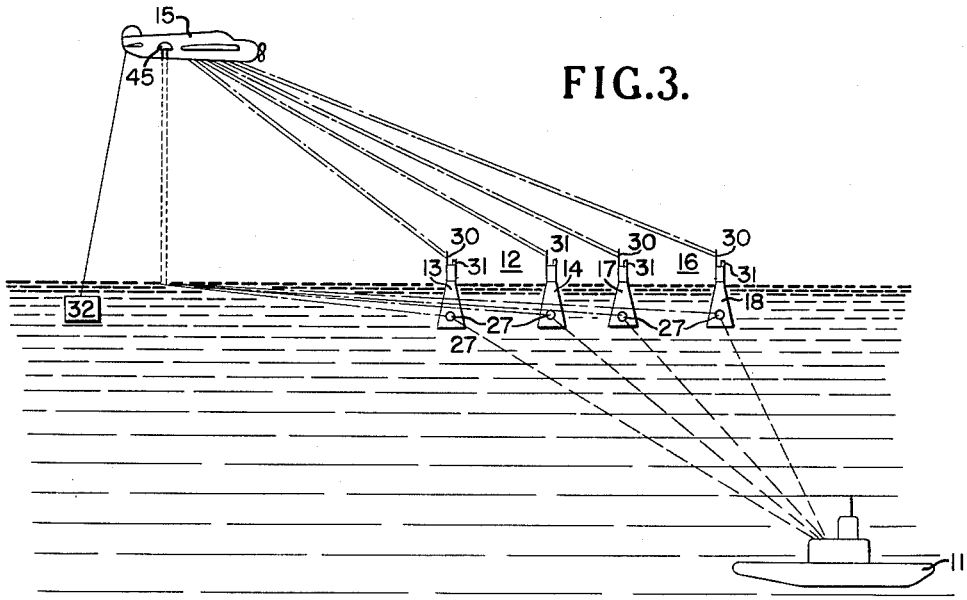
FIG.3.
FIG.4a.
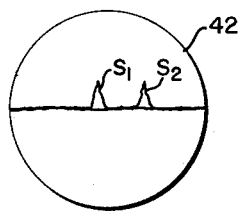
DISPLAY DEVICE
FOR SONOBUOYS 12
FIG.4c.
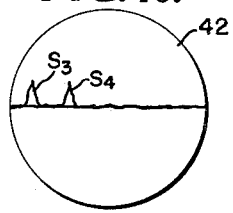
DISPLAY DEVICE
FOR SONOBUOYS 16
FIG.4b.
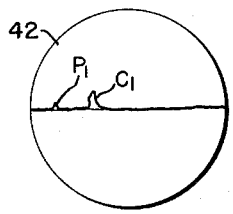
DISPLAY DEVICE
FOR SONOBUOYS 12
FIG.4d.
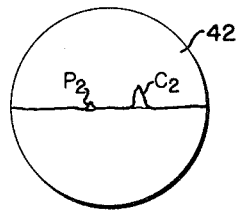
DISPLAY DEVICE
FOR SONOBUOYS 16
INVENTORS.
ZAKA I. SLAWSKY
SAMUEL J. RAFF
BY
ATTY.

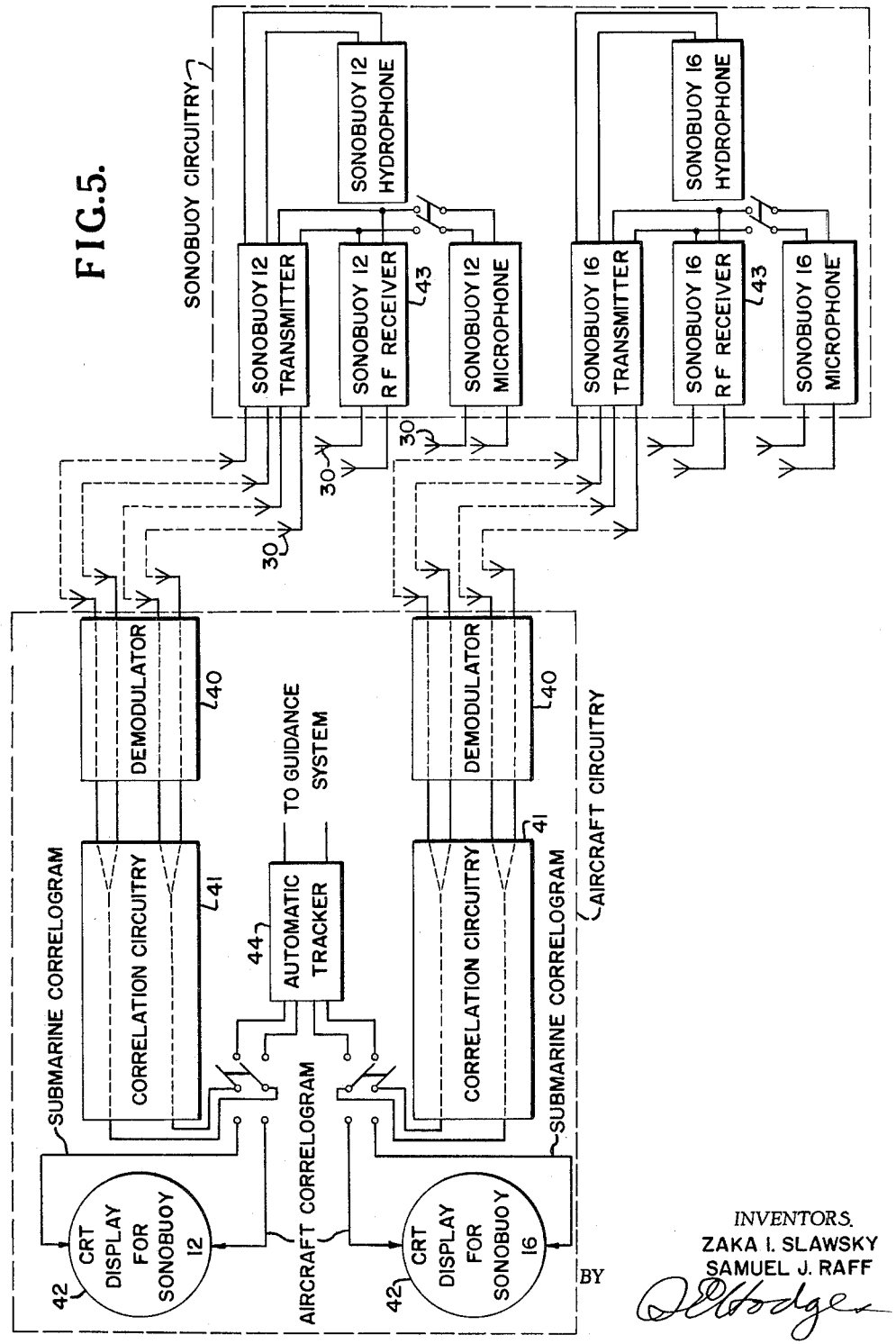

3,183,478
CORRELATION SONOBUOY SYSTEM
AND METHOD
Zaka I. Slawsky, Bethesda, and Samuel J. Raff, Chevy Chase, Md., assignors to the United States of America as represented by the Secretary of the Navy
Filed Feb. 25, 1963, Ser. No. 260,921
11 Claims. (Cl. 340—2)
(Granted under Title 35, U.S. Code (1952), sec. 266)

The invention described herein may be manufactured and used by or for the Government of the United States of America for governmental purposes without the payment of any royalties thereon or therefor.

The present invention relates to a system and method of submarine detection and tracking and more particularly to a correlation sonobuoy system wherein an aircraft such as an airplane or helicopter preferably equipped with anti-submarine weapons can be directed to a position directly above the submerged submarine via the signals received from the sonobuoy system.

In the field of anti-submarine warfare, it has been the general practice to employ correlation sonobuoy systems to provide the data necessary to calculate the range and bearing of a submerged submarine relative to the locations of the sonobuoys. Although such devices have served the purpose, they have not proved entirely satisfactory under all conditions of service for the reason that considerable difficulty has been experienced in accurately locating the sonobuoys with respect to the tracking craft due to drifting of the sonobuoys. This problem or difficulty becomes increasingly more acute when the sonobuoys are dropped from an aircraft into the water instead of being planted in the water by a ship or submarine because of uncontrolled drifting during the descent. Even when very mild sea conditions prevail and ocean currents are at a minimum, it is but a matter of minutes after a sonobuoy has been dropped that the location and spacing with respect to some reference point are sufficiently uncertain as to render the detectors useless. The maneuverability and speed of present day nuclear submarines make it necessary that the tracking system be effective for a sufficient period of time in order to locate the submarine after detection. This period of time in most instances involves more than a few minutes, and a reliable sonobuoy tracking system must therefore be dependably accurate for a considerable period of time.

The general purpose of this invention is to provide a correlation sonobuoy system which embraces all the advantages of similarly employed submarine detection and tracking systems and which does not possess the aforedescribed disadvantage. To attain this result the present invention contemplates a unique system wherein the sonobuoys to be used locate not only the submarine, but also the attacking aircraft, whereby variations in sonobuoy locations have no effect on the accuracy of the system. By using the sonobuoys to locate both the submarine and the attacking aircraft, errors derived from the plotting systems used in the aircraft and sonobuoys drift are avoided thereby enhancing the accuracy of the data which is supplied to the aircraft.

An object of the present invention is the provision of the new and improved method for submarine detection and tracking which utilizes a correlation sonobuoy network that provides accurate information independent of sonobuoy position and drift.

Another object is to provide a correlation sonobuoy system for tracking of submarines by aircraft which utilizes acoustic signals generated from the submarine being tracked and radio frequency signals from the tracking aircraft for positioning the aircraft directly above the submarine.

A further object of the invention is the provision of a correlation sonobuoy system for the detection and tracking of submarines by aircraft wherein the acoustic signals emanating both from the tracking aircraft and the submarine are utilized for positioning the aircraft directly about the submarine.

Still another object is to provide a correlation sonobuoy system for tracking submarines by aircraft wherein acoustic signals generated in the water directly below the aircraft and those emanating from the submarine are utilized to position the aircraft directly above the submarine.

Yet another object of the present invention is the provision of a correlation sonobuoy system for self-tracking of an aircraft which utilizes acoustic signals emanating from the aircraft to determine the position of the aircraft relative to the sonobuoy system.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 3 illustrates the method of generating acoustic signals in the water directly below the aircraft;

FIG. 4 illustrates the display of the correlated signals which provide an indication of the relative bearings of the submarine and the aircraft; and FIG. 5 is a block diagram representing the electrical circuitry used in the correlation sonobuoy system for determining the flight pattern of the tracking aircraft.

Figure 1:
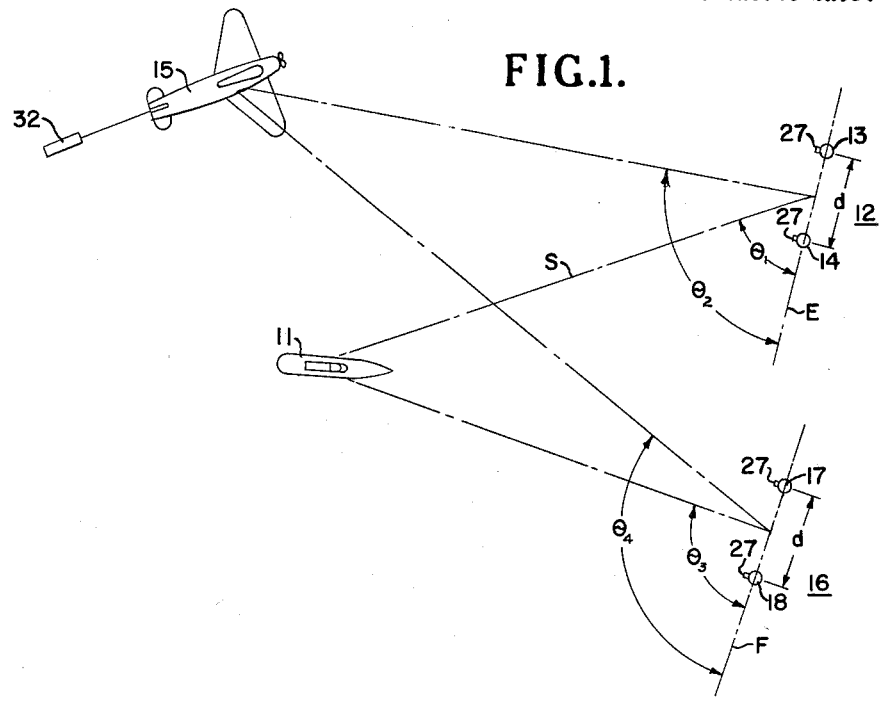
FIG. 1 illustrates a plan view of the geometry of the submarine tracking problem where the tracking vehicle is an aircraft and the detection devices are sonobuoys.

Referring now to the drawings, wherein like reference characters designate like or corresponding parts throughout the several views, there is shown in FIG. 1 a submarine 11 which is located at some distance represented by the line S, from a pair of sonobuoys 12. Each sonobuoy 13 and 14 is separated at a variable distance $d$ which depends upon their mutual spacing. A line drawn between the two sonobuoys 13 and 14 which is shown as extended line E represents the axis of the sonobuoy pair 12. Each sonobuoy has a hydrophone 27 in direct contact with the water which senses the acoustic noise signal emanating from the submarine 11 and an antenna 30 (FIG. 3) for receiving radio signals and transmitting radio signals corresponding to both the acoustic signals and radio signals received at the sonobuoy. These noise and radio signals are transmitted by a modulated radio signal from each sonobuoy to the aircraft 15. Radio receivers aboard the aircraft, receive the modulated radio signals from the sonobuoys 13 and 14 in separate channels and direct the channeled signals to demodulation and correlation solution circuitry (FIG. 5), the function of which is set forth in greater detail hereinafter.

It has been determined that the time delay which is measured as the difference in arrival times of an acoustical sound at sonobuoy 14 and sonobuoy 13 is indicative of the bearing of the sound source with respect to the axis of the sonobuoys. For example, if the acoustical sound source or submarine is on the perpendicular bisector of the axis E of the two sonobuoys 13 and 14, they will receive the noise signals simultaneously and the time delay between the arrival of the acoustic signal at sonobuoy 13 and sonobuoy 14 will be zero. Deviation of the sound source or submarine from this perpendicular bisector will yield a corresponding time delay which can be observed as a change in bearing of the submarine. In this manner the submarine bearing $\theta_1$ which is the angle formed by the intersection of the line S and the sonobuoy axis E can be determined. Therefore, it remains only to determine this time delay which is in turn an indication of the bearing.

By solving the correlation function for the two signals in the receiving channels and displaying the resulting correlogram on a display device such as a calibrated CRT, as shown in FIG. 5 an indication of the desired delay time results. Since the acoustic signals transmitted are carried by a modulating signal, it is first necessary to demodulate the signals in demodulator 40 so as to recover the desired acoustical signal. Then by the use of Deltic (an abbreviation for Delay Line Time Compressor) loops or other correlation means in the correlation circuitry 41 the two acoustic signals are multiplied together with different delay times introduced between them. Taking the average value of the product of this time delayed multiplication of the two acoustic signals is a computing process which results in the solution of the correlation function. United States Patent 2,958,039 to Victor C. Anderson provides a detailed analysis of the correlation function solution of two signals by means of Deltic processing.

Since the correlation function is the average value of the product of the signals as a function of delay, the peak or maximum value of the correlation function amplitude indicates the optimum delay which is the difference in arrival times of the submarine noise signal at the two hydrophones 27. This time delay is a measure of the bearing of the submarine with respect to the axis E of the two sonobuoys 13 and 14.

Thus, it may be seen that a pair of hydrophones 27 will detect submarine noise signals, and by correlation processing of the two detected signals an indication of the bearing $\theta_1$ of the submarine 11 with respect to the axis E of the two sonobuoys 13 and 14 which house the hydrophones 27 can be obtained. A second pair of sonobuoys 16, in like manner, is capable of locating the submarine 11 by providing a bearing $\theta_3$ with respect to the axis F of said sonobuoy pair 16. The intersection of the two lines representing the bearings $\theta_1$ and $\theta_3$ derived from the sonobuoy pairs 12 and 16, respectively, is an indication therefore of the position of the submarine 11. If the location of the four sonobuoys used is known, with respect to some coordinate system, conventional plotting techniques will provide the pilot of the aircraft with the position of the submarine and he can direct the aircraft to this location and, if desired, dispatch his anti-submarine weapons or otherwise utilize this information.

Major inaccuracies in prior systems of this character arise from lack of information concerning the exact location of the sonobuoy pairs 12 and 16. These inaccuracies are due to the fact that the sonobuoys are dropped from the aircraft while in flight, and drifting of the sonobuoys from a desired predetermined location is brought about by air currents during the descent and ocean currents which tend to alter the position of the sonobuoys after the descent. This drifting constitutes a particularly significant source of error and renders the sonobuoy system useless after a very short period of time.

The present invention employs sonobuoys to detect and transmit the acoustic noise signals which emanate from a submerged submarine as herein above described. Also, the aforedescribed correlation function solution is utilized to determine the delay time between the arrival of a signal emanating from a submarine at the two-spaced hydrophones. However, the sonobuoys perform the additional function of locating the aircraft relative to the submarine by providing an indication of the bearing angles $\theta_2$ and $\theta_4$ thereby obviating the necessity of acquiring precise information about the location of the sonobuoy pairs. This function is performed in such a way that the coincidence of the aircraft and submarine position is clearly indicated without the need for a geometric coordinate system and therefore independent of precise information defining the exact sonobuoy position.

Considering again the single pair of sonobuoys 12 in FIG. 1 and the circuitry of FIG. 5, it may be observed that the airplane receives the radio signals from the two sonobuoys 13 and 14. These signals are demodulated in separate channels to obtain the acoustic signals received by the sonobuoy hydrophones 27. Deltic loops, or similar equipment, provide the necessary correlogram of the outputs of the two sonobuoy hydrophones 27 thereby providing an indication of the signal delay times necessary to determine the bearing. It may be assumed for the purpose of description that the separation of the hydrophone pair is small compared to the distance to the submarine and also to the aircraft. The position of the peak or maximum value of the correlogram (FIG. 4) can be displayed on any suitable display device such as a calibrated oscilloscope 42 for visual tracking or can be used as an input to an automatic tracker 44. Therefore the display device will provide an indication of the direction from which the acoustic signal arrives at the hydrophone pair 27. If $d$ is the spacing between the sonobuoys, and $C_S$ the velocity of sound in the water, then the delay at which the peak of the correlogram occurs is given by:

$$\Delta_1 = \frac{d}{C_S} \cos \theta_1$$

where $\theta_1$ is the angle shown in FIG. 1 formed by the axis E of the hydrophone pair and the line S drawn from the submarine 11 to a point on the axis E equidistant from sonobuoys 13 and 14.

In like manner, when the airplane 15 transmits radio frequency signals and RF receivers 43 mounted above the water line on each sonobuoy receives these signals, the delay time between the reception of such signals at the two sonobuoys 13 and 14 can be transmitted back to the aircraft for determining the bearing $\theta_2$ of the aircraft. This delay time can be represented by the expression:

$$\Delta_2 \frac{2d}{C_L} \cos \theta_2$$

where $C_L$ is the velocity of radio signal propagation and $\theta_2$ is shown in FIG. 1 as the angle formed by the intersection of the sonobuoy axis E and a line drawn from the airplane 15 to a point on the axis E equidistant from the sonobuoys 13 and 14.

Therefore, if $$\frac{\Delta_1}{\Delta_2} = \frac{C_L}{2C_S}$$

the angles $\theta_1$ and $\theta_2$ are equal and the airplane is at the same bearing with respect to the sonobuoy pair as is the submarine.

Figure 2:
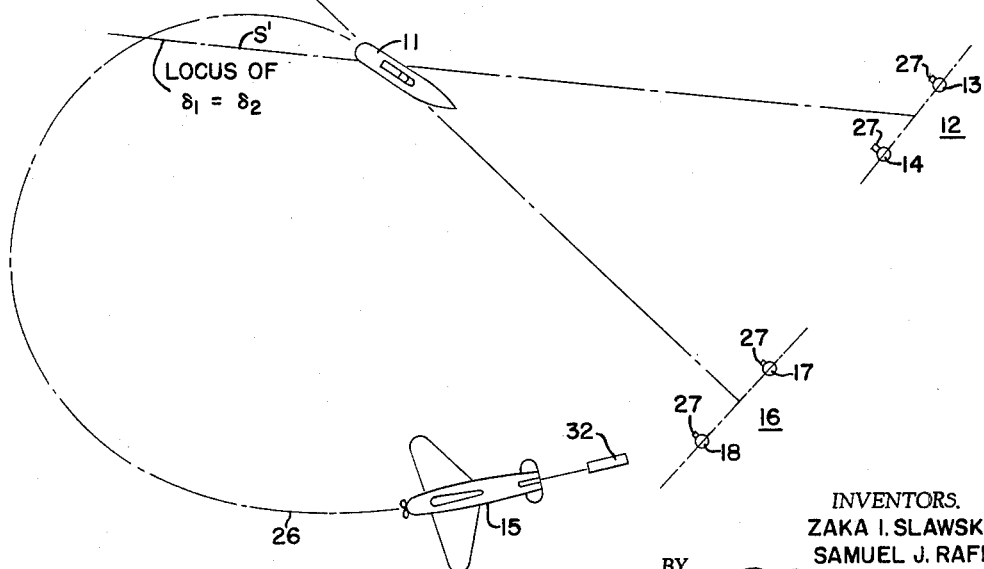
FIG. 2 illustrates the positioning of the submarine with respect to the sonobuoy and the attack pattern of the tracking aircraft.

Assuming that there are two sonobuoy pairs 12 and 16 from which the airplane is receiving the time delay information signals resulting from the RF signals indicative of the aircrafts own position and the acoustical signals indicative of the submarine position, this information undergoes the aforedescribed Deltic processing and is supplied to oscilloscopes 42 or similar display devices corresponding to each sonobuoy pair 12 and 16. The correlogram $C_1$ (FIG. 4b) of the acoustical signals and the correlogram $P_1$ of the RF signals, whose displacement from a given origin is proportional to $\Delta_2$, are displayed on the oscilloscope. Sweeping rates of the oscilloscope are arranged in the ratio of $C_L/2C_S$ in order to compensate for the difference in velocity of propagation between the RF signal and the acoustical signal. Therefore, if the correlogram $P_1$ is superimposed directly over the peak or maximum value of the correlogram $C_1$ on one of the display devices, the bearing angles $\theta_1$ and $\theta_2$ will be equal and, therefore, the aircraft 15 and submarine 11 have the same bearing with respect to the sonobuoy pair 12 which is providing the input information data to the oscilloscope. By maneuvering the aircraft in a large circle 26 around the hydrophones as shown in FIG. 2 and observing the correlograms $C_1$ and $P_1$, the pilot is able to position the aircraft along the bearing which coincides with the submarine bearing for the sonobuoy pair 12. He then turns the aircraft and flies on this bearing toward the sonobuoy pair 12. By observing the movement of the correlogram $P_2$ with respect to the peak of the correlogram $C_2$ on the display device 42 which is responsive to the information signals from sonobuoy pair 16, the pilot can determine whether or not his aircraft is converging on or diverging from the submarine 11. By observing the overlay of the correlograms produced by the signals coming from the second pair of sonobuoys 16 and displayed on the second display device 42 and concurrently keeping the correlogram $P_1$ at the peak of the correlogram $C_1$ on the first display device, the pilot is able to fly the course along the S' (FIG. 2) until coincidence of the aircraft 15 and submarine 11 is indicated by the correlogram peak matching on both of the display devices. This coincidence of aircraft and submarine bearings indicates that the plane is, in fact, directly over the submarine and that the homing torpedo or depth bomb should be dispatched at this point.

Should the aircraft 15 be heading in the wrong direction along the bearing as determined by divergence of the correlogram peaks on the second display device (FIG. 4d), the pilot can bring the aircraft about to the proper flight path by changing the course by 180°.

It should be understood that the signals transmitted from the aircraft to the sonobuoys and then back to the aircraft for determining the position of the aircraft with respect to the sonobuoys need not be radio frequency signals which require correlation processing to calculate the time delay. Instead, pulses could be transmitted, and the arrival times of the pulses at the pairs of sonobuoys can be retransmitted to the aircraft and utilized to start and stop the sweep on a calibrated oscilloscope to determine the delay time of the pulse arrival which corresponds to the aircraft bearing. Other bearing calculating techniques familiar to those skilled in the radar art could be employed with success tantamount to the correlation technique. This is possible because the signals transmitted from the aircraft are known and need not be distinguished from the noise and background signals as is necessary with the signal emanating from the submarine.

When the correlated sonobuoy system is operating in the aforedescribed manner wherein radio frequency signals or pulses are transmitted from the aircraft to the sonobuoys, it becomes necessary to employ conventional intricate timing circuits in resolving and measuring the short time delays encountered at the sonobuoy pairs. A second method of locating the aircraft 15 with respect to the sonobuoy pairs 12 and 16 is accomplished by utilizing the acoustic signal generated by the aircraft rather than a radio frequency signal. This procedure retains the advantage of being able to determine the bearing of the aircraft with respect to the sonobuoys without having to know the precise location of the sonobuoys, but at the same time avoids the necessity of short time resolution. Acoustic signals propagating in air have a velocity much nearer that of the velocity of sound in water than radio frequency signals thereby avoiding the problem of short time resolution in determining the delay time occurring at the two sonobuoys. By mounting a simple microphone 31 above the surface of the water at each sonobuoy instead of an RF receiver, the acoustic signals generated at the aircraft by normal operation can be detected by the microphones 31 just as the radio frequency pulses were detected by the RF receivers and the delay time signals transmitted back to the aircraft for correlation processing. This correlation processing will yield the angle between the line defining the position of the aircraft and the line adjoining the hydrophones. This process is similar to the correlation process performed on the signals sensed by the hydrophones; the essential difference being that the velocity of sound in air is involved instead of the velocity of sound in water. This difference is approximately a factor of four and by adjustment of the sweeping rates of the display devices for the two correlograms, the proper compensation for matching is obtained.

When the acoustic signals sensed by the hydrophones and the acoustic signals sensed by the microphones 31 are transmitted to the aircraft on separate radio channels, the correlation processing circuitry in the aircraft receives the signals and provides two correlograms to each of two display devices 42. Each display device exhibits the two correlograms derived from the microphones 31 and hydrophones 27 at one of the sonobuoy pairs FIGS. 4a and 4c. When the two correlograms are displayed on the same oscilloscope, it is possible by a simple adjustment of the sweeping rates to spread out the one correlogram approximately four times that of the other to compensate for the difference in the velocity of sound in air and the velocity of sound in water. Therefore, the coincidence of the two correlogram peaks $S_1$, $S_2$ and $S_3$, $S_4$ on the oscilloscopes, 42 indicates that the airplane is on the same bearing with respect to the sonobuoy pairs 12 and 16 respectively as that of the submarine. The airplane need only fly along that bearing, as it did in the case where the aircraft was transmitting radio frequency signals or pulses, which fixes its location with respect to the first pair of sonobuoys 12, and observe a similar display arrangement obtained from data observed at the second display device associated with the second pair of sonobuoys 16. When these two correlogram peaks $S_3$ and $S_4$ coincide, the aircraft is positioned directly over the submarine. It should be noted that the problem of short time resolution is thereby completely eliminated by utilizing an acoustical noise signal which is generated from the aircraft itself. The elimination of the intricate circuitry necessary for short time resolution enhances the bearing accuracies of such correlated sonobuoy systems to the extent that a negligible error of approximately one submarine length at a distance of five nautical miles is achieved. Certainly such accuracies are within acceptable limitations where the aircraft is dispatching a nuclear depth bomb or homing torpedo. In fact under most conditions, such accuracy is sufficient for conventional depth charge attack.

The system depending upon the acoustical noise generated at the aircraft for determining the position of the aircraft with respect to the sonobuoys is similar to the system which utilizes the radio frequency signals or pulses which are transmitted from the aircraft to determine the position except that the ratio $C_L/2C_S$ is replaced by replaced by $C_a/C_S$ where $C_a$ is the velocity of sound in air and $C_S$ is the velocity of the sound in water. In each of the systems however, no plotting is required and there is no reliance placed on gyro compasses or the location of the sonobuoy pairs.

An alternative to the method of location of the aircraft by means of acoustical noise generation at the aircraft is the generation of acoustical noise in the water directly below the aircraft. This alternative is carried out as illustrated in FIG. 3 by firing projectiles into the water directly under the aircraft 15 or towing a noisemaker 32 in the water. The projectiles, when fired into the water impart kinetic energy to the water and can be detected as an acoustical signal characteristic of the shape, angle of impact, and firing rate of the projectiles. This dissipation of kinetic energy of the projectile hitting the water is used as an acoustic noise source to indicate the plane's position and is detected by the sonobuoys in the same manner that the noise signal generated by the submarine is detected. Differentiation of the acoustical noise signals generated by the projectiles or the noisemaker 32 and the submarine signal is accomplished by programming the firing and triggering of the projectile launcher and noisemaker, respectively, in a coded manner. Calculation of the relative bearings of the submarine and aircraft with respect to the detecting sonobuoys is accomplished in the same manner as set forth hereinabove. This method of generating the acoustic noise for determining the position of the aircraft with respect to the sonobuoys has two distinct advantages; (1) the bending of sound waves in water due to obstructions such as schools of fish or inherent water characteristics does not introduce any appreciable errors because both of the acoustic signals used for determining the positions of the aircraft and the submarine undergo the same bending effect, thereby requiring merely a repositioning of the aircraft until the observation is made that the respective correlogram peaks coincide; (2) errors which might be introduced by a change in the velocity of sound in air due to wind and temperature changes are avoided.

Any projectile launcher which can fire the projectiles at approximately 3,000 feet per second will provide the desired results. FIG. 3 shows the use of a standard machine gun 45 which can be automatically fired at programmed intervals from the aircraft. It has been determined that a standard .50 caliber machine gun firing slugs into the water will generate an acoustical signal in the water which can be detected at a distance of approximately 6 nautical miles. Such an acoustical signal is well within the requirements for such correlation sonobuoy systems.

In summary, the invention provides a new and improved method and system for submarine tracking which utilizes a correlation technique to process signals received by sonobuoy pairs in determining the relative positions of the submarine and a tracking aircraft. Lack of precise data defining the exact location of the sonobuoy pairs does not render the system inaccurate. Furthermore, only one pass over the submarine is necessary to deliver a weapon thereby minimizing any possibility of detection.

It should be realized that in the case where the aircraft is an airplane which travels at high speeds, a certain amount of prediction can be employed to release the weapon on a calculated distance before the correlation peaks are superimposed. This precedure compensates for the movement of the aircraft from the position where the tracking signals were initiated to the position where they are received upon return from the sonobuoys. However, if a slow moving aircraft or helicopter is used, no prediction for an advanced release is necessary, because the distance traveled between the transmission and reception of signals is inconsequential. The prediction technique is only necessary, therefore, where the aircraft and submarine speeds are very high compared to the delay in the tracking system and weapon releasing device. It is simply a matter of calculating in advance when the superimposed condition of the display signals will occur in real time and releasing the weapon a sufficient time before the superimposed condition to compensate for the delay in the system.

Whereas the invention has been described with particularity with reference to an anti-submarine warfare system, it will be understood that various other arrangements may be employed, for example, the sonobuoys could be anchored in one fixed location and utilized by the aircraft firing projectiles into the water for self-tracking purposes or communication with friendly submarines where radio communication is not possible because of enemy detection.

Obviously many modifications and variations of the present invention are possible in the light of the above teachings. It is therefore to be understood, that within the scope of the teachings herein and the appended claims, the invention may be practiced otherwise than as specifically described.

What is claimed and desired to be secured by Letters Patent of the United States is:

1. The method of positioning an aircraft directly above a submerged submarine comprising the steps of:
   (a) transmitting tracking signals from the aircraft,
   (b) dropping a first and second pair of sonobuoys from said aircraft within the vicinity of said submerged submarine thereby to transmit channeled radio signals from each of said sonobuoys corresponding to acoustic signals emanating from said submarine and tracking signals emanating from said aircraft and received at each sonobuoy,
   (c) receiving channeled signals transmitted from each sonobuoy corresponding to said acoustic signals received from said submarine and said tracking signals received from said aircraft,
   (d) generating a first and second correlation signal from said channeled signals corresponding to the pairs of acoustic signals received at said first and second pair of sonobuoys respectively,
   (e) generating a third and fourth correlation signal from said channeled signals corresponding to the pairs of tracking signals received at said first and second pair of sonobuoys respectively,
   (f) visibly displaying said first and third correlation signals on a first display device and said second and fourth correlation signals on a second display device,
   (g) maneuvering said aircraft to a bearing where the peaks of the correlation signals appearing on said first display device are superimposed,
   (h) maintaining said bearing of the aircraft which yields the superimposed correlation signals on said first display device and concurrently therewith,
   (i) positioning the aircraft until the peaks of said second and fourth correlation signals are superimposed on said second display device thereby to give the indication that said aircraft is positioned directly above said submarine.

2. The method of positioning an aircraft directly above a submerged submarine comprising the steps of:
   (a) generating an acoustic signal from a noise source towed by the aircraft,
   (b) dropping a first and second pair of sonobuoys from the aircraft within the vicinity of a submerged submarine thereby to transmit channeled radio signals from each of said sonobuoys corresponding to acoustic signals emanating from said submarine and acoustic signals emanating from said noise source and received at each sonobuoy,
   (c) receiving channeled signals transmitted from each sonobuoy corresponding respectively to said signals received from said submarine and said noise source,
   (d) generating a first and second correlation signal from said channeled signals corresponding to the pairs of submarine acoustic signals received at said first and second pair of sonobuoys respectively,
   (e) generating a third and fourth correlation signal from said channeled signals corresponding to the pairs of acoustic signals emanating from said noise source and received at said first and second pair of sonobuoys respectively,
   (f) visibly displaying said first and third correlation signals respectively upon a first display device,
   (g) visibly displaying said second and fourth correlation signals respectively upon a second display device,
   (h) maneuvering said aircraft to a bearing where the peaks of the correlation signals appearing on said first display device are superimposed,
   (i) maintaining said bearing of the aircraft which yields the superimposed correlation signals on said first display device and concurrently therewith,
   (j) positioning the aircraft until the peaks of said second and fourth correlation signals are superimposed on said second display device thereby to give the indication that said aircraft is positioned directly above said submarine.

3. The method of positioning an aircraft directly above a submerged submarine comprising the steps of:
   (a) transmitting radio frequency signals from the aircraft,
   (b) dropping a first and second pair of sonobuoys from the aircraft within the vicinity of a submerged submarine thereby to transmit channeled radio signals from each of said sonobuoys corresponding to acoustic signals emanating from said submarine and radio frequency signals emanating from said aircraft and received at each sonobuoy, (c) receiving channeled signals transmitted from each sonobuoy corresponding to said acoustic signals received from said submarine and said radio frequency signals received from said aircraft, (d) generating a first and second correlation signal from said channeled signals corresponding to the pairs of acoustic signals received at said first and second pair of sonobuoys respectively, (e) generating a third and fourth correlation signal from said channeled signals corresponding to said radio frequency signals received at said first and second pair of sonobuoys respectively, (f) visibly displaying said first and third correlation signals on a first display device and said second and fourth correlation signals on a second display device, (g) maneuvering said aircraft to a bearing where the peaks of the correlation signals appearing on said first display device are superimposed, (h) maintaining said bearing of the aircraft which yields the superimposed correlation signals on said first display device and concurrently therewith.

(i) positioning the aircraft until the peaks of said second and fourth correlation signals are superimposed on said second display device thereby to give the indication that said aircraft is positioned directly above said submarine.

4. The method of positioning an aircraft directly above a submerged submarine comprising the steps of:

(a) propelling projectiles into the water directly under the aircraft for emanating acoustic signals under said aircraft, (b) dropping a first and second pair of sonobuoys from said aircraft within the vicinity of said submerged submarine thereby to transmit channeled radio signals from each of said sonobuoys corresponding to acoustic signals emanating from said submarine and said acoustic signals emanating from a position in the water directly under the aircraft, (c) receiving channeled signals transmitted from each sonobuoy corresponding to said acoustic signals received from said aircraft and said projectiles, (d) generating a first and second correlation signal from said channeled signals corresponding to the pairs of submarine acoustic signals received at said first and second pair of sonobuoys respectively, (e) generating a third and fourth correlation signal from said channeled signals corresponding to the pairs of projectile acoustic signals received at said first and second pairs of sonobuoys respectively.

(f) visibly displaying said first and third correlation signals on a first display device and said second and fourth correlation signals on a second display device, (g) mauneuvering said aircraft to a bearing where the peaks of the correlation signals appearing on said first display device are superimposed, (h) maintaining said bearing of the aircraft which yields the superimposed correlation signals on said first display device and concurrently therewith, (i) positioning the aircraft until the peaks of said second and fourth correlation signals are superimposed on said second display device thereby to give the indication that said aircraft is positioned directly above said submarine.

5. The method of positioning an aircraft directly above a submerged submarine comprising the steps of:

(a) firing machine gun slugs into the water directly under the aircraft for generating said acoustic signals under said aircraft, (b) dropping a first and second pair of sonobuoys from said aircraft within the vicinity of said submerged submarine thereby to transmit channeled radio signals from each of said sonobuoys corresponding to acoustic signals emanating from said submarine and said acoustic signals emanating from a position in the water directly under the aircraft, (c) receiving channeled signals transmitted from each sonobuoy corresponding to said acoustic signals received from said aircraft and said slugs, (d) generating a first and second correlation signal from said channeled signals corresponding to the pairs of submarine acoustic signals received at said first and second pair of sonobuoys respectively, (e) generating a third and fourth correlation signal from said channeled signals corresponding to the pairs of slug acoustic signals received at said first and second pairs of sonobuoys respectively, (f) visibly displaying said first and third correlation signals on a first display device and said second and fourth correlation signals on a second display device, (g) maneuvering said aircraft to a bearing where the peaks of the correlation signals appearing on said first display device are superimposed.

(h) maintaining said bearing of the aircraft which yields the superimposed correlation signals on said first display device and concurrently therewith, (i) positioning the aircraft until the peaks of said second and fourth correlation signals are superimposed on said second display device thereby to give the indication that said aircraft is positioned directly above said submarine.

6. The method of providing a self-tracking indication to an aircraft flying over water for positioning said aircraft directly above an underwater acoustic noise source comprising the steps of:

(a) generating an acoustic signal in the water directly under the aircraft, (b) detecting at spaced locations said generated acoustic signals and the acoustic signals emanating from said underwater noise source, (c) converting said detected signals into display signals indicative of the respective positions of said aircraft and said underwater noise source with respect to said spaced locations, (d) displaying said aircraft and underwater noise source position signals on a visual display device, (e) positioning the aircraft until said display signals which are indicative of said aircraft and underwater noise source position signals are superimposed thereby to give the indication that said aircraft is positioned directly above said noise source.

7. In a system for detecting a submarine and positioning a tracking aircraft directly above said submarine, in combination;

(a) a radio receiver carried by an aircraft for receiving channeled signals, (b) generating means carried by said aircraft for transmitting a position indicating signal, (c) a transmitting station having means for transmitting channeled signals to said radio receiver corresponding to acoustic signals emanating from said submarine and position indicating signals emanating from said aircraft and sensed by receiving means at said transmitting station, (d) computing means connected to said radio receiver for processing said channeled signals thereby indicating the relative positions of said aircraft and said submarine, and (e) automatic tracking means connected to said computing means for positioning said aircraft responsive to said computing means whereby said aircraft can be positioned directly above said submarine.

8. In a system for detecting a submarine and positioning a tracking aircraft directly above said submarine, in combination;

(a) a first radio receiver carried by said aicraft for receiving channeled signals, (b) a radio frequency transmitting means carried by said aircraft for transmitting a position indicating signal,
(c) a plurality of sonobuoys each located in the water and having an antenna, a transmitter and a second radio receiver positioned above the water for communication with said aircraft and acoustic signal receiving means positioned below the water for detecting acoustic signals emanating from said submarine,
(d) computing means connected to said first receiver for processing said channeled signals thereby indicating the relative positions of said aircraft and said submarine, and
(e) automatic tracking means connected to said computing means and responsive to said computing means for positioning the aircraft directly above said submarine.

9. In a system for detecting a submarine and positioning a tracking aircraft directly above said submarine, in combination;
(a) a radio receiver carried by said aircraft for receiving channeled signals,
(b) acoustic signal generating means carried by said aircraft for transmitting a position indicating signal,
(c) a plurality of sonobuoys each located in the water and having an antenna, a transmitter and a microphone positioned above the water providing a communication link with said aircraft and acoustic signal receiving means positioned below the water for detecting acoustic signals emanating from said submarine,
(d) computing means connected to said radio receiver for processing said channeled signals thereby indicating the relative positions of said aircraft and said submarine, and
(e) automatic tracking means connected to said computing means for positioning said aircraft responsive to said computing means whereby said aircraft can be positioned directly above said submarine.

10. In a system for detecting a submarine and positioning a tracking aircraft directly above said submarine, in combination;
(a) a radio receiver carried by said aircraft for receiving channeled signals,
(b) projectile launching means carried by said aircraft for repetitively generating coded acoustic signals in the water directly below said aircraft upon projectile impact with the water,
(c) a plurality of sonobuoys each located in the water and having an antenna and a transmitter positioned above the water for transmitting channeled radio signals to said aircraft and an acoustic signal receiving means connected to said transmitter and positioned below the water for detecting acoustic signals emanating from said submarine and from said acoustic signal generating means respectively,
(d) computing means connected to said radio receiver for processing said channeled signals thereby determining the relative positions of said acoustic signal generating means and said submarine, and
(e) automatic tracking means connected to said computing means for positioning said aircraft responsive to said computing means whereby said aircraft can be positioned directly above said submarine.

11. The combination set forth in claim 10 wherein;
(a) said projectile launching means is a machine gun.

No references cited.

CHESTER L. JUSTUS, *Primary Examiner.*